(12) United States Patent
Perraud et al.

(10) Patent No.: US 7,286,042 B2
(45) Date of Patent: Oct. 23, 2007

(54) PASSIVE COMMUNICATION DEVICE AND PASSIVE ACCESS CONTROL SYSTEM

(75) Inventors: Eric Perraud, Toulouse (FR); Bruno Baylac, Austin, TX (US); Michel Burri, Le Grand-Saconnex (CH)

(73) Assignee: Freescale Semiconductor, Inc., Austin, TX (US)

( * ) Notice: Subject to any disclaimer, the term of this patent is extended or adjusted under 35 U.S.C. 154(b) by 304 days.

(21) Appl. No.: 10/481,111

(22) PCT Filed: Jun. 3, 2002

(86) PCT No.: PCT/EP02/06067

§ 371 (c)(1),
(2), (4) Date: Aug. 12, 2004

(87) PCT Pub. No.: WO02/100666

PCT Pub. Date: Dec. 19, 2002

(65) Prior Publication Data

US 2005/0052286 A1    Mar. 10, 2005

(30) Foreign Application Priority Data

Jun. 13, 2001    (EP) .................................. 01401533

(51) Int. Cl.
*H04Q 5/22* (2006.01)
(52) U.S. Cl. .................. 340/10.33; 340/10.1; 340/10.3; 340/10.4; 340/825.69; 340/825.72; 340/10.34; 340/5.72; 340/442; 340/505
(58) Field of Classification Search ............. 340/10.33, 340/10.1, 10.3, 10.4, 825.69, 825.72, 5.6, 340/5.64, 5.72, 10.34
See application file for complete search history.

(56) References Cited

U.S. PATENT DOCUMENTS

| | | | | |
|---|---|---|---|---|
| 5,355,513 A | * | 10/1994 | Clarke et al. | 455/20 |
| 5,790,746 A | | 8/1998 | Kashida et al. | |
| 5,790,946 A | * | 8/1998 | Rotzoll | 455/343.1 |
| 5,973,617 A | | 10/1999 | Reichmeyer et al. | |
| 6,198,913 B1 | * | 3/2001 | Sung et al. | 340/10.33 |
| 6,630,885 B2 | * | 10/2003 | Hardman et al. | 340/505 |
| 6,664,899 B1 | * | 12/2003 | Tsuchihashi | 340/10.34 |
| 2001/0010491 A1 | * | 8/2001 | Marneweck et al. | 340/10.33 |
| 2002/0075134 A1 | * | 6/2002 | Schieke et al. | 340/10.4 |

FOREIGN PATENT DOCUMENTS

| | | |
|---|---|---|
| DE | 195 03 756 A1 | 8/1996 |
| EP | 0 502 566 A1 | 9/1992 |
| EP | 0 808 971 A3 | 9/2000 |
| GB | 2 272 135 A | 5/1994 |
| GB | 2 351 618 A | 1/2001 |
| WO | WO 96/06747 A2 | 3/1996 |

\* cited by examiner

*Primary Examiner*—Brian Zimmerman
*Assistant Examiner*—Vernal Brown

(57) ABSTRACT

A communication device comprising an internal power source, first and second receiver elements for receiving signals transmitted from the base station, and a processor selectively responsive to a modulation of the received signal to generate a data signal for transmission to the base station. The first receiver element has lower power consumption than the second receiver element does when energised. At least during a standby state of the device, the first receiver element is activated to detect the presence of a received signal, the second receiver element and the processing means being de-energised. The first receiver element is responsive to detection of a received signal to trigger an active state in which the second receiver element is activated to respond selectively to the frequency of the signal received to actuate the processor. The invention is applicable to vehicle access control systems, and tyre pressure monitoring systems.

12 Claims, 2 Drawing Sheets

PASSIVE COMMUNICATION DEVICE AND PASSIVE ACCESS CONTROL SYSTEM

FIELD OF THE INVENTION

This invention relates to a communication system in which a communication device transmits data to a base station in response to an interrogation from the base station, the communication device and the base station communicating remotely, by transmitted signals. The invention is particularly, but not exclusively, applicable to communication by electromagnetic signals, which expression is to be understood as covering signals in which the magnetic field component is predominant as well as signals in which the magnetic and electric field components are of comparable magnitude.

BACKGROUND OF THE INVENTION

In some known communication systems, the portable device is of the active kind, in which an action of the user on the portable device, such as pressing a button on the portable device, is required to actuate the transmission of a signal over an electromagnetic transmission path to the base station. The portable device may therefore be totally de-energised until the user actuates transmission of the signal, which avoids unwanted consumption of energy except when the user actuates the device. However, actuation of the device in this way by the user is additional to the actions associated with his primary purpose (such as opening a door, starting an engine or starting use of the data processing equipment for example) and accordingly is inconvenient.

The present invention relates to a communication system of the so-called 'passive' kind comprising a communication device capable of transmitting a coded identification signal to the base station without specific action of the user on the communication device in response to reception of an interrogation signal from the base station. As used herein, the expression 'passive communication device' includes a device provided with means that may be actuated by a user to trigger transmission to the base station without reception of an interrogation signal from the base station, in addition to its normal passive operation.

A communication system in accordance with the present invention is particularly, but not exclusively, applicable to an access control system and, more particularly, to an access control system of the kind including a portable device which identifies the user of the device to the base station by transmitting a coded identification signal to the base station. The base station may include a mechanism coupled to a door or other closure in order to unlock the door and enable physical entry of the user in response to a valid identification signal received from the portable device; the base station may perform other types of access control, such as control of the enabling of an operational function, and in particular starting an engine or access to use of data processing equipment, for example.

Since the communication device in a passive system must be ready to receive the interrogation signal from the base station and so is energised normally at all times, this can require significant power consumption which is a problem particularly for battery operated devices.

An access control system including a passive communication system is described in the article reference 980381 by Stephan Schmitz and Christopher Roser entitled "A New State-of-the-Art Keyless Entry System, published by the Society of Automotive Engineers in 1998. This publication recognises the need to reduce the power consumption of the transponder described to very low levels but fails to indicate how this objective can be achieved by the internal construction of the transponder.

The present invention is also applicable to other communication systems in which a passive battery powered communication device is responsive to an interrogation signal from a base station, for example, in a system for monitoring the pressure of the tyres of a vehicle: the base station is installed on the bodywork of the vehicle while the communication device is installed in the tyre, coupled with a pressure sensor.

There is therefore a need to obtain a low level of power consumption of the communication device, especially in a standby mode and in the case of an integrated circuit structure, to achieve low cost of the communication device.

SUMMARY OF THE INVENTION

The present invention provides a passive communication device comprising an internal power source, receiver means for receiving signals transmitted from the base station, and processing means selectively responsive to an interrogation signal received from a base station to generate a data signal for transmission to the base station. The receiver means comprises a first receiver element and a second receiver element, the first receiver element having lower power consumption than the second receiver element does when energised. At least during a standby state of the device, the internal power source energises the first receiver element so as to detect the presence of a received signal, the second receiver element and the processing means not being energised from the internal power source. The first receiver element is responsive to detection of a received signal to trigger an active state of operation of the communication device in which the internal power source energises the second receiver element so that the second receiver element is selectively responsive to a characteristic of the signal received to actuate the processing means.

The characteristic to which the second receiver element is selectively responsive is preferably a frequency of the signal received, the second receiver element being arranged to actuate the processing means if the frequency is between upper and lower limits. The processing means preferably comprises demodulator means responsive to a modulation of the received signal, said internal power source being arranged to energise said demodulator means in said active state in response to actuation by said second receiver element. The receiver means preferably comprises reset means for triggering said standby state in the absence of a signal received by said first receiver element and of the transmission of a signal by the communication device.

DETAILED DESCRIPTION OF PREFERRED EMBODIMENTS OF THE INVENTION

Figure 1:
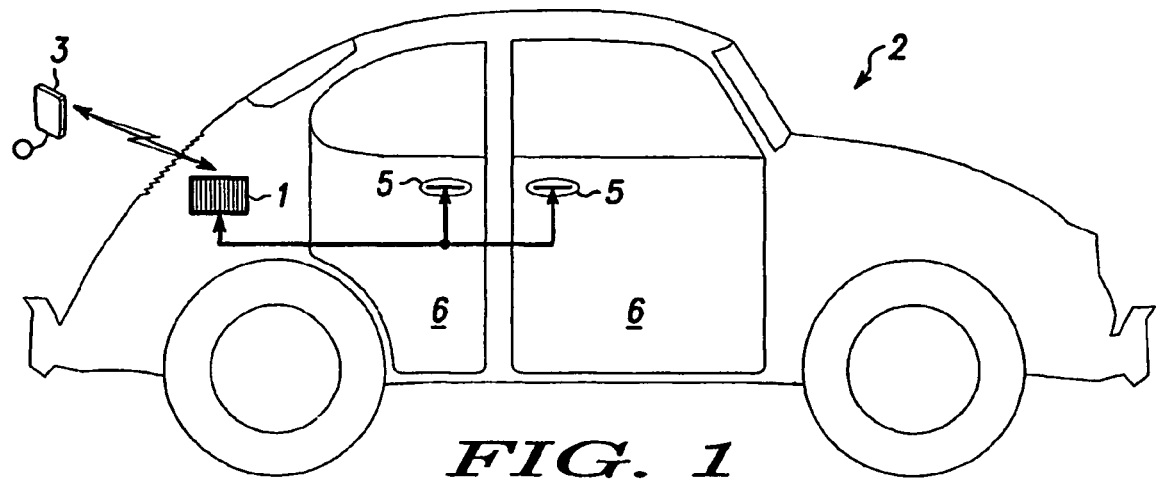
FIG. 1 is a schematic diagram of a vehicle equipped with an access control system comprising including a communication system in accordance with one embodiment of the invention.
Figure 2:
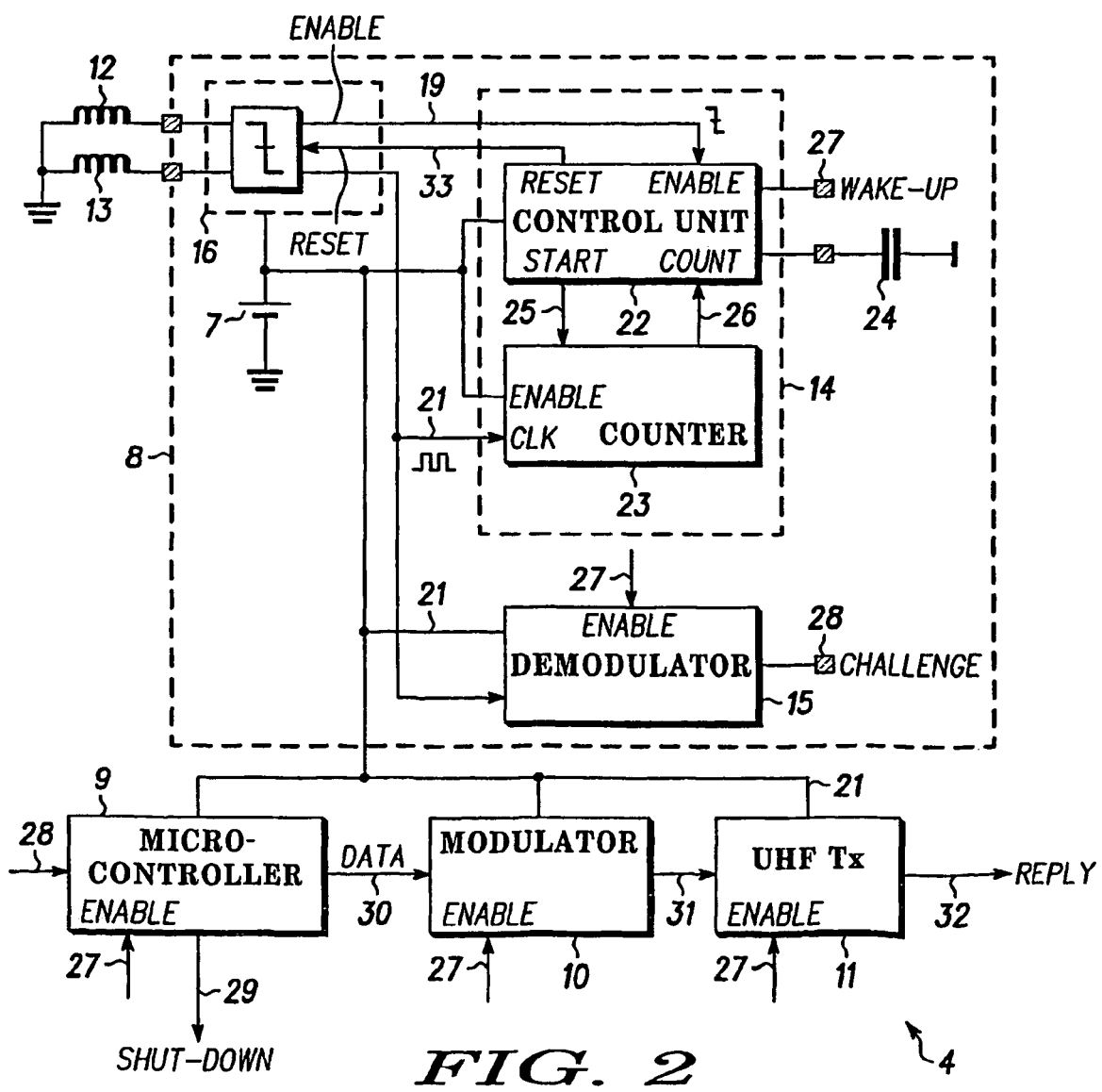
FIG. 2 is a block diagram of a transceiver stage in the communication system of FIG. 1.

The wireless access and control system shown in FIG. 1 and FIG. 2 of the accompanying drawings comprises a communication system including a base station 1 installed on a vehicle 2 and a portable device 3, which may be in the form of a badge or key fob, and includes a communication device comprising a transceiver 4. The vehicle has door lock mechanisms 5, including handles, latches and locks, mounted on doors 6. The system is operative to unlock the doors 6 in response to movement of one of the handles of the door lock mechanisms 5 by a user seeking to open the door, provided that the user is carrying the portable device 3 and it is validated as identifying the user by the base station 1. The portable device 3 is passive, so that no specific action of the user on the portable device 3 is necessary to unlock the doors in normal operation of the system.

The base station 1 is coupled to the handles of the door lock mechanisms 5 so as to transmit a challenge in the form of an interrogation signal in response to movement of a door handle. The communication is two way: the portable device 3 transmits back a reply in the form of a data signal including an identification code in response to reception of the interrogation signal if the interrogation signal received is valid. The base station 1 is also coupled to the door lock mechanisms 5 so as to trigger unlocking of the doors 6 of the vehicle so as to enable the user's movement of a door handle 5 to open the corresponding door 6 if the reply is valid.

The challenge is an electromagnetic signal, preferably in the Low Frequency ('LF') range (30 to 300 kHz). The portable device 3 comprises an internal battery 7 as primary power source so that a predefined communication range (typically about 1.5 m) with the base station 1 is made possible; the portable device 3 is normally energized by the battery 7 and not by the electromagnetic field generated by the base station. The portable device reply is an electromagnetic data signal at a carrier frequency in the Ultra High Frequency ('UHF') range (300 to 3000 MHz).

The portable device 3 includes an LF receiver 8 that must normally be energised permanently so that the portable device 3 does not miss any LF challenge. Therefore a key objective for such a portable device is a very low current consumption by the LF receiver. The transceiver 4 has an active state, in which it is capable of processing the interrogation signal and generating the data signal and a standby mode in which only the receiver 8 is energised so that its power consumption is reduced to optimise the lifetime of the battery 7.

The portable device 3 also includes a micro-controller 9, a modulation stage 10 and a transmission stage 11, operating in the UHF range, which implies higher power consumption than at lower frequencies; however these elements are only energised intermittently, at the moments when transmission of data is required in response to an interrogation, that is to say when the challenge data are recognised as valid by the portable device.

In the present embodiment of the invention the LF challenge is at a frequency of 125 kHz although other frequencies may be used. The currently targeted standby current for the LF receiver 8, and hence for the whole transceiver, is less than '5 µA'.

Referring now to FIG. 2 of the drawings in more detail, the portable device 3 includes two (or more) magnetic antennas (loop antennas or ferrite antennas) 12 and 13 in order to guarantee good electromagnetic reception irrespective of the orientation of the antennas and which are coupled to respective input channels of the LF receiver 8, only one of which is shown in the drawings, the other channels being similar.

Each channel of the LF receiver 8 comprises a series of modules that are energised or activated sequentially if and only if a predefined condition is filled and which are automatically shut down afterwards.

The LF receiver 8 comprises receiver means including an LF carrier frequency detector 14 and a data demodulator 15 (if security requirements necessitate decoding a signal modulated on the carrier), as shown, and an input stage 16. The input stage comprises a channel for each of the antennas 12 and 13 (only one being shown in the drawing); the data demodulator 15 is common to the receiver channels. When the receiver 8 detects the presence of an LF field on one or other of the antennas 12 and 13, it outputs a wake-up signal to trigger the active state of the transceiver 4 in which the micro-controller 9 is awoken and the demodulator 15 activated to receive the challenge data. Moreover, the other receiver modules inside the LF receiver 8 are not all permanently turned on but are also turned on sequentially.

The LF electromagnetic up-link signal consists of a wake-up signal, which may be a non-modulated LF 125 kHz signal and then (if required by the security level of the application) encoded challenge data modulated onto the carrier signal.

Figure 3:
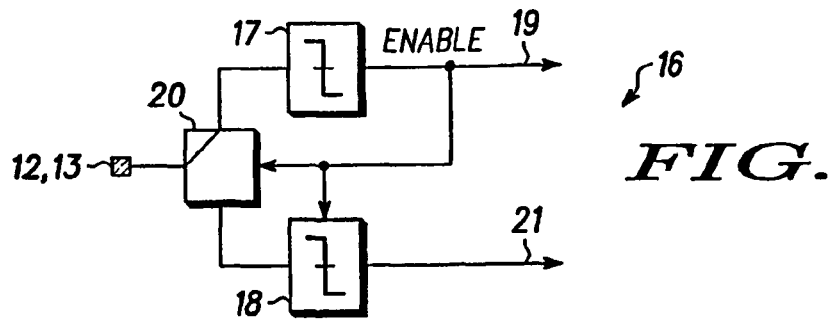
FIG. 3 is a more detailed block diagram of an automatic shutdown comparator in the transceiver stage of FIG. 2.

The input stage 16 for each of the receiver channels includes respective comparator modules 17 and 18, as shown in FIG. 3. Each of the comparator modules 17 and 18 produces a simple binary output in response to the presence or absence of an input signal without any capacitor.

More specifically, as shown in FIG. 3, each input stage includes a front-end comparator module 17 that is permanently energised by the internal battery 7 in the standby state, unless the battery is discharged. In fact, in the preferred embodiments of the invention, this is the only module in the whole transceiver that is energised (and therefore activated) in the standby mode. The front-end comparator module 17 is a low-speed comparator (it is not able to transmit the LF carrier frequency); the second comparator module 18 is a higher-speed comparator and in particular it is able to pass an electrical signal which is at the same frequency as the LF carrier or higher. The front-end comparator module 17 is able to have lower power consumption than the second comparator module 18 does (when energised) because its bandwidth is low. In the current embodiment, both comparator modules 17 and 18 have very low and fixed thresholds (in the range of a few millivolts) so that they are able to detect a LF carrier at the targeted distance.

In standby (when there is no LF field), the higher-speed, higher power-consumption comparator modules 18 are switched off (de-energised) and the lower-speed, low power-consumption comparator modules 17 of both receiver channels are switched on. The LF antennas 12 and 13 are coupled to the low-power comparators 17.

When the portable device 3 receives an LF electromagnetic field, an LF current flows in the magnetic antennas 12 and 13 and feeds the low power-consumption comparators 17. The low power-consumption, lower-speed comparators 17 are not able to follow the frequency of variation of the current but constitute a first receiver element that detects the presence of a signal received at the antennas and produce a binary 'enable' signal 19 that is passed to the higher-speed comparator modules 18 and the LF carrier frequency detector 14 to trigger an active state of the device.

In response to the enable signal 19, the higher-speed comparator modules 18 are enabled (energised). The LF carrier frequency detector 14 also includes a switch 20 that normally connects the respective antenna to the corresponding low power comparator 17 but which responds to the enable signal 19 to connect the antenna to the higher speed comparator 18. The higher speed comparator 18 then outputs a shaped LF clock signal 21 that is at the same frequency as the LF carrier. In the preferred embodiment of the invention, the low power-consumption comparators 17 are de-energised during the remainder of the active state of the transceiver; however, the reduction of power consumption is not large and in an alternative embodiment of the invention they are left energised during the active state also.

The LF carrier frequency detector 14 also includes a control unit 22 and a counter 23. The control unit 22 is common to the two receiver channels and includes a capacitive timer circuit 24. The higher speed comparator 18, together with the control unit 22, the counter 23 and the timer circuit 24 form a second receiver element selectively responsive to a characteristic of the signal received, namely its carrier frequency, for pursuing the wake-up sequence by triggering energisation of the processing means comprising the micro-controller 9 and the demodulator 15.

When the first edge (falling or rising edge) detected by the low-speed comparator 17 produces the enable signal 19 to turn on the higher speed comparator 18, it also enables the control unit 22. The control unit 22 is connected to the counter 23 and sends it a start signal 25 and also simultaneously starts the timer circuit 24 to time 'a period of time of T μs defined by' the external capacitance of the timer circuit. In practice, there is a different counter 23 for each receiver channel and the control unit 22 sends the start signal 25 only to the counter 23 that is associated with the channel where the enable signal 19 is produced.

During time period T, the counter 23 counts the corresponding number of LF clock pulses 21, detected from the periodic alternations of the received input current. The counter 23 is connected to the control unit 22, which reads the counting result 26. When the time-out is complete, if a valid LF carrier was detected, the counting result is expected to be within two limits around a pre-determined value N (limits depend on the timer accuracy), N being such that:

$N/F_{LF}=T$, where $F_{LF}$ is the frequency of the carrier;

If the counting result is within these two limits, the control unit 22 outputs a wake-up signal 27 that awakens the following stages of the transceiver 4.

If the counting result is not within the expected limits at the end of the time-out, the control unit 22 does not output the wake-up signal 27 but, instead, generates a reset signal 33 that is dispatched to the higher power-consumption comparator modules 18, the low-power comparator modules 17 and the counters 23. The reset signal 33 resets the input stage 16 so that the higher power-consumption comparator modules 18 are turned off and the low-power comparator modules 17 are turned on. It also activates the switch 20 to couple the magnetic antennas 12 and 13 back to the low-power comparator modules 17 and de-energises the counters 23 and the control unit 22 itself. Accordingly, intermittent noise at the wrong frequency only energises part of the detector higher power elements and only energises them for the duration of the noise.

The control unit 22 is connected to send the wake-up signal 27 to the micro-controller 9, so as to energise it, if the counting result is within the expected limits; the micro-controller is typically woken up by 'pulling down' a wake-up pin of the micro-controller, that is to say applying a negative pulse to it. The control unit 22 is also connected to send the wake-up signal 27 to the data demodulator 15 to energise it and the control unit 22 also connects the input of the demodulator 15 to the receiver channel which first responded to a valid LF carrier on its antenna.

Figure 4:
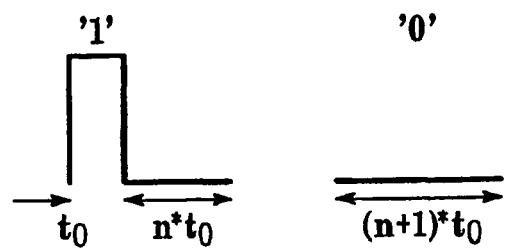
FIG. 4 is a diagram of the encoding format in an interrogation signal in operation of the access control system of FIG. 1.

The demodulator 15 is responsive to a challenge signal encoded on the carrier 21, preferably by modulation, such as pulse-position modulation, that does not necessitate automatic gain control in the transceiver 4. The preferred modulation, which is shown in FIG. 4, is a variant in which each pulse is followed by a gap of longer duration. More particularly, each field is of length (n+1) bits, a '1' being represented by a pulse of length one bit followed by the absence of a pulse during n bits and a '0' being represented by the absence of a pulse during (n+1) bits. The choice of this latter modulation is due to the observation that the thresholds of the comparators are fixed and very low. The rise time and fall times of a LF system are usually long so that a LF electromagnetic pulse is recovered as a longer pulse because of the low thresholds. That is the reason why it is preferred to shut down the LF field before the end of a logical high data, so that it does not spread over the time slot of any logical low data in the next field.

The architecture of the challenge demodulator 15 is simple. It does not need automatic gain control (AGC) as the input signal amplitude is controlled by the output voltage swing of the high-speed comparators 18. It consists in a simple low-pass filter and a data slicer that corrects the shape of the digital signal and converts it into a digital demodulated signal 28 that the micro-controller can process. This demodulator 15 is enabled by the wake-up signal 27 only when the control unit 22 has detected an LF carrier whose frequency is between the upper and lower limits in one of the antennas 12 and 13.

The micro-controller 9 is connected to receive the demodulated signal 28 from the demodulator 15 and checks whether it contains a valid challenge signal. The micro-controller 9 is connected to the control unit 22 to send it a shutdown signal 29 if there is no valid challenge signal. It is also connected to the modulator 10 to send it identification data 30 in response to a valid challenge in the demodulated signal 28, the modulator 10 is connected to the transmitter 11 to send it a signal 31 modulated with the identification data 30, and the transmitter is connected to the antennas 12 and 13 to send them a transmission signal 32 modulated by the modulation signal 31, constituting the reply to the challenge.

The operation of the vehicle access control system described above is as follows. The operation is normally triggered in the passive mode in response to a single natural ancillary gesture of the user, such as turning or pulling the handle of the locked vehicle door 6 to open it. The user accordingly does not need previously to take hold of nor actuate the portable communication device 3 as well in order to unlock the door 6, its presence within the electromagnetic field of the base station and validation of its identity by the base station being sufficient. The base station 1 senses the gesture of the user (the initial movement of the door handle mechanism 5), transmits the interrogation signal 21 and unlocks the doors 6 if (and only if) a valid coded identification reply signal 32 is received from the portable device 3 in response to the interrogation signal corresponding with a pre-set encoding protocol or definition of valid codes.

Figure 5:
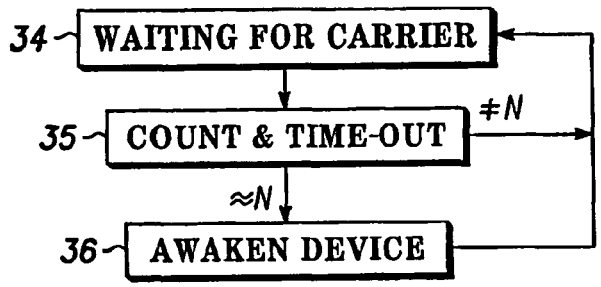
FIG. 5 is a flow chart of the operation of the comparator of FIG. 3.

The sequence of the wake-up and automatic shutdown operation of the LF carrier frequency detector 14 is summarised in FIG. 5.

Initially, the receiver is in the state 34 'waiting for carrier': only the front-end stage 8 is turned on and, within the front-end stage, only the low-speed, low-power comparators 17 are turned on; they are coupled to the antennas 12 and 13.

On detecting an edge, the receiver passes to the 'count' state 35: the enable signal 19 is sent to all the modules of the LF carrier frequency detector 14, which are energised, and to the high-speed and high-power comparators 18, which are turned on and are coupled to the magnetic antennas 12 and 13.

Lastly, if the carrier frequency corresponds to the interrogation signal carrier frequency, the receiver passes to the 'awake the device' state 36: the wake-up signal 27 is sent to the demodulator 15, micro-controller 9, modulator 10 and UHF transmitter 11 stages to awaken them. Additionally, the challenge demodulator 15 (if required) is turned on.

If the challenge signal is invalid, the micro-controller 9 outputs the shut-down signal 29 to the control unit 22, which triggers the generation of the reset signal 33 to put the detector back into standby mode and the demodulator 15 and micro-controller 9, modulator 10 and UHF transmitter 11 stages to de-energise them.

If the challenge signal is valid, the micro-controller 9 outputs the identification code data 30 to the modulator 10 and the UHF transmitter stage 11 transmits the identification data in the transmitted reply 32 to the base station 1, which unlocks the doors 6 of the vehicle 2 to enable the user's movement of the door handle 5 to open the corresponding door. The micro-controller 9 then sends the shutdown signal 29 to the control unit 22, which triggers the generation of the reset signal 33 to put the detector back into standby mode and de-energise the demodulator 15 and micro-controller 9, modulator 10 and UHF transmitter 11.

Although the communication device is energised by the battery in normal operation, it is capable of functioning also when the battery is discharged. The communication device is accordingly arranged to be capable of remote powering by the base station field if it is presented within one or two centimetres of the base station. This implies however that the difference between the maximum received signal when the communication device is very close to the base station antenna and the minimum when it is at its maximum operational range may be as high as 100 dB. The use of comparators for the input receiver elements accommodates such variation in the input signal.

The communication system of the present invention described above is a passive system, that is to say it is capable of functioning in the passive mode. However, even though this is the mode the user will usually choose, the portable device 3 is also capable of functioning as an active device, for long range operation at several meters, for example, and incorporates a push-button (not shown) for triggering transmission of the identification signal to the base station 1 independently of its normal mode of passive operation in response to the interrogation by the base station.

The low power consumption of the transceiver 4 described above is particularly advantageous in a passive communication device, where the input receiver stage of the communication device is normally energised in order to sense the interrogation signal and its power consumption must accordingly be low, especially in the standby state, so that the discharge of the battery is slow and the battery life is prolonged.

The receiver input stages 16 for the receiver channels each include two comparator modules 17 and 18, as shown in FIG. 3. This structure consumes considerably less current, especially in the standby mode, than would an input receiver section comprising a permanently energised LF amplifier stage with AGC. The use of comparators as the receiver modules avoids the necessity for a capacitor (as in an AGC amplifier), which would occupy a large area on an integrated circuit in the case of an internal capacitor, or would require connection pads on the integrated circuit in the case of an external capacitor, again occupying a large area on the integrated circuit, with consequent cost disadvantages.

Figure 6:
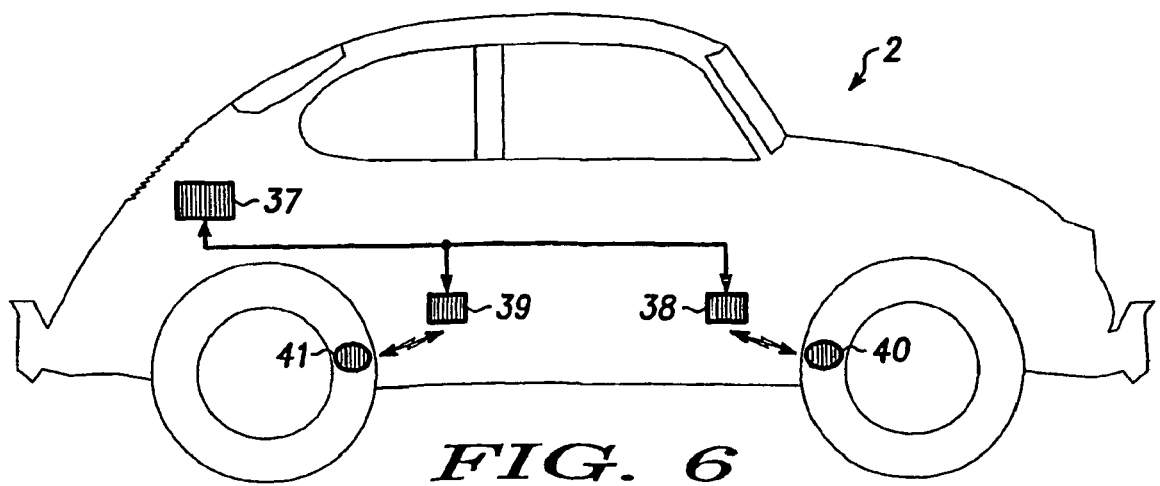
FIG. 6 is a schematic diagram of a vehicle equipped with a tyre pressure monitoring system including a communication system in accordance with another embodiment of the invention

A communication system as described above can also be used in a tyre pressure monitoring system as in another embodiment of the present invention shown in FIG. 6. In such an application, a body controller unit 37 is coupled with LF base stations 38 and 39 mounted on the vehicle bodywork, which is a non-rotating part of the vehicle, close to respective vehicle wheels. In the preferred embodiment of the invention, the body controller unit 37 and base stations 38 and 39 are coupled through direct wired connections; however, in a variant they are coupled through a CAN bus. The wheels of the vehicle incorporate communication devices 40 and 41 comprising transceivers 4, similar to those described above with reference to the access control system and including LF receivers 8, micro-controllers 9 and UHF transmitters 11 as previously described with reference to FIG. 1 to FIG. 6 of the accompanying drawings. The communication devices 40 and 41 also comprise sensors (not shown) responsive to the air pressure in the tyres of the respective wheels and connected to the micro-controllers 9 to supply data thereto for transmission to the base stations 38 and 39 instead of the identification data 30 of the access control system previously described. In a preferred embodiment of the system the sensors of the communication devices 40 and 41 are also responsive to the tyre temperature.

While the vehicle is immobilised, the system is de-energised, to avoid unnecessary power consumption. At periodic time intervals when the vehicle engine is started, the body controller unit 37 instructs one of the base stations 38 and 39 to transmit an LF field comprising an interrogation signal 21 to the adjacent one of the communication devices 40 and 41. This field presence will be detected by an LF receiver 8 as described previously which is integrated in this one of the communication devices 40 and 41 and it will be detected only by the receiver of this communication device as the ranges of the LF fields transmitted by the base stations 38 and 39 are arranged to be too short to activate any of the other communication devices 40 and 41. After checking the frequency of the received signal, to avoid unnecessary wake-up due to noise and interference, the receiver 8 will then awaken the micro-controller 9 and the UHF transmitter 11 of the communication device. The pressure and temperature data of the interrogated tyre are then transmitted to the body controller 37.

To minimise the power drain on the battery, the communication device and pressure sensor are only activated to transmit data in response to an interrogation signal from the base station. A system where the tyre installation transmitted at regular intervals, without any signal transmitted from the base station to trigger Rs operation would consume power during the periods when the vehicle was immobile and out of use as well as when it was moving; as the tyre pressure monitoring function is required primarily during use of the vehicle, and a very high proportion of most vehicles' lives is spent out of use, the power consumption of such a system would be unnecessarily high compared to the system of the present invention, in which the communication device's operation is triggered by the base station only when required. Moreover, the system described in which selected ones of the tyre pressure monitoring communication devices are interrogated in turn under the control of the body controller is preferable to implementations where the tyre pressure monitoring communication devices transmits the pressure and temperature data at self-timed regular intervals without central interrogation, since it avoids data collision between the responses of two wheels which occurs when two tyres transmit simultaneously their pressure and temperature. Additionally, it minimizes the current consumption of the tyre pressure monitoring systems and thus improves the lifetime of the tyre pressure monitoring communication devices, and it offers a simple solution to the issue of tyre identification enabling pressure to be associated with the wheel's position on the vehicle even if two wheels of the vehicle have been exchanged.

The invention claimed is:

1. A passive communication device for use in a communication system also having a base station, the communication device comprising an internal power source, receiver means for receiving signals transmitted from the base station, and processing means selectively responsive to an interrogation signal received from the base station by said receiver means to generate a data signal for transmission to the base station,
    wherein said receiver means comprises a first receiver element and a second receiver element, said first receiver element having a lower power consumption when energised than said second receiver element does when energised,
    said communication device having a standby state in which said internal power source energises said first receiver element so as to detect the presence of a received signal, and in which said second receiver element and said processing means are de-energised,
    said first receiver element being responsive to detection of a received signal to trigger a state of operation of said communication device in which said internal power source energises said second receiver element,
    said second receiver element, when energised, being selectively responsive to a characteristic of the signal received to enable said internal power source to energise said processing means and to trigger an active state of operation in which said processing means is actuated,
    and said processing means comprising demodulator means responsive to a modulation of the received signal when said demodulator means is actuated.

2. A passive communication device as claimed in claim 1, wherein said characteristic to which said second receiver element is selectively responsive is a carrier frequency of the signal received, said second receiver element being arranged to actuate said processing means if said carrier frequency is between upper and lower limits.

3. A passive communication device as claimed in claim 2, wherein said second receiver element comprises an input receiver element, counter means for counting cycles of the received signal and timing means for defining a time period during which the number of said cycles is counted.

4. A passive communication device as claimed in claim 1, wherein said first and second receiver elements present frequency pass bands with upper limits, the upper limit of the frequency pass band of said first receiver element being lower than the upper limit of the frequency pass band of said second receiver element.

5. A passive communication device as claimed in claim 1, wherein the communication system comprises a passive access control system including said passive communication device, which is included in a portable device, and said base station, said passive communication device and said base station communicating by electromagnetic signals, and said base station being responsive to said data signal for selectively enabling access for a user of the portable device,
    wherein a carrier frequency of said interrogation signal transmitted by said base station is in the Low Frequency range (30 to 300 kHz) and in that a carrier frequency of said data signal transmitted by said portable device is in the Ultra High Frequency range (300 to 3000 MHz).

6. A passive communication device as claimed in claim 1, wherein the communication system comprises a passive access control system including said communication device, which is included in a portable device, and said base station, which is responsive to an action of the user of the system to transmit said interrogation signal and is selectively responsive to reception of a corresponding data signal from said communication device selectively to enable access for the user.

7. A passive communication device as claimed in claim 1, wherein the communication system comprises a tyre pressure monitoring system including said passive communication device, which is mounted in a wheel of the vehicle in association with pressure sensing means for providing data to said processing means, and said base station, which is mounted on a non-rotating part of said vehicle and said communication device,
    said base station transmitting said interrogation signal at intervals of time and being responsive to reception of the corresponding data signal from said communication device to register said data.

8. A passive communication device for use in a communication system also having a base station, the communication device comprising an internal power source, receiver means for receiving signals transmitted from the base station, and processing means selectively responsive to an interrogation signal received from the base station by said receiver means to generate a data signal for transmission to the base station,
    wherein said receiver means comprises a first receiver element and a second receiver element, said first receiver element having a lower power consumption when energised than said second receiver element does when energised,
    said communication device having a standby state in which said internal power source energises said first receiver element so as to detect the presence of a received signal, and in which said second receiver element and said processing means are de-energised,
    said first receiver element being responsive to detection of a received signal to trigger a state of operation of said communication device in which said internal power source energises said second receiver element,
    said second receiver element, when energised, being selectively responsive to a characteristic of the signal received to enable said internal power source to energise said processing means and to trigger an active state of operation in which said processing means is actuated, and said receiver means comprises reset means for triggering said standby state in the absence of a signal received by said first receiver element and of the transmission of a signal by the communication device.

9. A passive communication device as claimed in claim 8, wherein said reset means is responsive to said characteristic of the signal received by said second receiver element being outside upper and lower limits for triggering said standby state.

10. A passive communication device as claimed in claim 8, wherein the communication system comprises a tyre pressure monitoring system including said passive communication device, which is mounted in a wheel of the vehicle in association with pressure sensing means for providing data to said processing means, and said base station, which is mounted on a non-rotating part of said vehicle and said communication device, said base station transmitting said interrogation signal at intervals of time and being responsive to reception of the corresponding data signal from said communication device to register said data.

11. A passive communication device for use in a communication system also having a base station, the communication device comprising an internal power source, receiver means for receiving signals transmitted from the base station, and processing means selectively responsive to an interrogation signal received from the base station by said receiver means to generate a data signal for transmission to the base station, wherein said receiver means comprises a first receiver element and a second receiver element, said first receiver element having a lower power consumption when energised than said second receiver element does when energised, said communication device having a standby state in which said internal power source energises said first receiver element so as to detect the presence of a received signal, and in which said second receiver element and said processing means are de-energised, said first receiver element being responsive to detection of a received signal to trigger a state of operation of said communication device in which said internal power source energises said second receiver element, said second receiver element, when energised, being selectively responsive to a characteristic of the signal received to enable said internal power source to energise said processing means and to trigger an active state of operation in which said processing means is actuated, and said receiver means comprising antenna means for receiving transmitted signals and switch means for connecting said antenna means with said first receiver element, said switch means being responsive to detection by said first receiver element of a signal received by said antenna means to trigger connection of said antenna means with said second receiver element.

12. A passive communication device as claimed in claim 11, wherein the communication system comprises a tyre pressure monitoring system including said passive communication device, which is mounted in a wheel of the vehicle in association with pressure sensing means for providing data to said processing means, and said base station, which is mounted on a non-rotating part of said vehicle and said communication device, said base station transmitting said interrogation signal at intervals of time and being responsive to reception of the corresponding data signal from said communication device to register said data.

* * * * *